(12) United States Patent
Benedetti et al.

(10) Patent No.: US 11,652,336 B2
(45) Date of Patent: *May 16, 2023

(54) LOW AND MEDIUM VOLTAGE ELECTRICAL ENCLOSURE

(71) Applicant: ABB S.p.A., Milan (IT)

(72) Inventors: Pierceleste Benedetti, Orsenigo (IT); Alessio Bergamini, Gazzaniga (IT); Giuseppe Nava, Ponte Lambro (IT); Damiano Cagliani, Brivio (IT)

(73) Assignee: ABB S.P.A., Milan (IT)

( * ) Notice: Subject to any disclaimer, the term of this patent is extended or adjusted under 35 U.S.C. 154(b) by 286 days.

This patent is subject to a terminal disclaimer.

(21) Appl. No.: 17/077,301

(22) Filed: Oct. 22, 2020

(65) Prior Publication Data

US 2021/0119425 A1    Apr. 22, 2021

(30) Foreign Application Priority Data

Oct. 22, 2019 (EP) ..................... 19204683

(51) Int. Cl.
    *H02B 1/56* (2006.01)
    *H02B 1/38* (2006.01)
    *H02B 3/00* (2006.01)

(52) U.S. Cl.
    CPC ............... *H02B 1/565* (2013.01); *H02B 1/38* (2013.01); *H02B 3/00* (2013.01)

(58) Field of Classification Search
    CPC ............. H02B 1/38; H02B 1/565; H02B 3/00
    See application file for complete search history.

(56) References Cited

U.S. PATENT DOCUMENTS

| 7,143,762 B2 | 12/2006 | Harrison |
| 9,078,340 B2 | 7/2015 | Cagliani |

(Continued)

FOREIGN PATENT DOCUMENTS

| CA | 2561695 A1 | 3/2008 |
| CA | 2824495 A1 | 6/2012 |

(Continued)

OTHER PUBLICATIONS

European Patent Office, Extended Search Report, issued in corresponding Application No. 19204683.7, dated Mar. 13, 2020, 8 pp.

*Primary Examiner* — James O Hansen
(74) *Attorney, Agent, or Firm* — Armstrong Teasdale LLP

(57) ABSTRACT

A low and medium voltage electrical enclosure comprising a supporting structure which defines an internal space delimited by walls forming one or more compartments housing one or more electrical apparatuses. At least one of said walls is provided with one or more venting openings that put into communication said internal space with the outside of said low voltage electrical enclosure and/or one of said compartments with a second compartment. The venting openings are provided with a cover closing a corresponding venting opening in a first—closed—operating condition at first predetermined temperatures and the enclosure is provided with an actuating device adapted to open said cover in a second—open—operating condition at second predetermined temperatures. The actuating device comprises an actuating mechanism having a Shape Memory Alloy-based (SMA-based) actuating element having a first dimension at said first predetermined temperatures reversibly changeable into a second dimension at said second predetermined temperatures, the reversible change of dimension of said SMA-based actuating element from said first dimension to said second dimension determining the reversible movement of (Continued)

said cover from said first—closed—operating condition to said second—open—operating condition, and vice-versa.

18 Claims, 9 Drawing Sheets

(56) References Cited

U.S. PATENT DOCUMENTS

| | | | |
|---|---|---|---|
| 10,855,059 B2 | 12/2020 | Valsecchi | |
| 10,938,189 B2 | 3/2021 | Valsecchi | |
| 2003/0116413 A1* | 6/2003 | Narusevicius | H01H 9/104 200/50.21 |
| 2010/0089549 A1 | 4/2010 | Su | |
| 2010/0112924 A1* | 5/2010 | Alexander | F16K 17/042 454/70 |
| 2010/0167636 A1* | 7/2010 | Bhattacharya | H05K 5/0213 454/239 |
| 2010/0330894 A1* | 12/2010 | Alexander | B60H 1/241 454/162 |
| 2018/0090914 A1* | 3/2018 | Johnson | H02B 1/20 |
| 2021/0119425 A1 | 4/2021 | Benedetti | |

FOREIGN PATENT DOCUMENTS

| | | | | |
|---|---|---|---|---|
| CN | 108988176 A | 12/2018 | | |
| CN | 208316074 U | 1/2019 | | |
| CN | 109462163 A | 3/2019 | | |
| JP | S5966305 U | 5/1984 | | |
| JP | S6146839 A | 3/1986 | | |
| JP | S62147245 A | 7/1987 | | |
| JP | S62272060 A | 11/1987 | | |
| JP | H02197781 | * | 8/1990 | F25D 17/08 |
| JP | H03226208 A | 10/1991 | | |
| JP | H04125010 A | 4/1992 | | |
| JP | H0622417 A | 1/1994 | | |
| JP | H0698427 A | 4/1994 | | |
| KR | 20200001522 U | 7/2020 | | |
| KR | 102353884 B1 | 1/2022 | | |
| SE | 460239 B | 9/1989 | | |

* cited by examiner

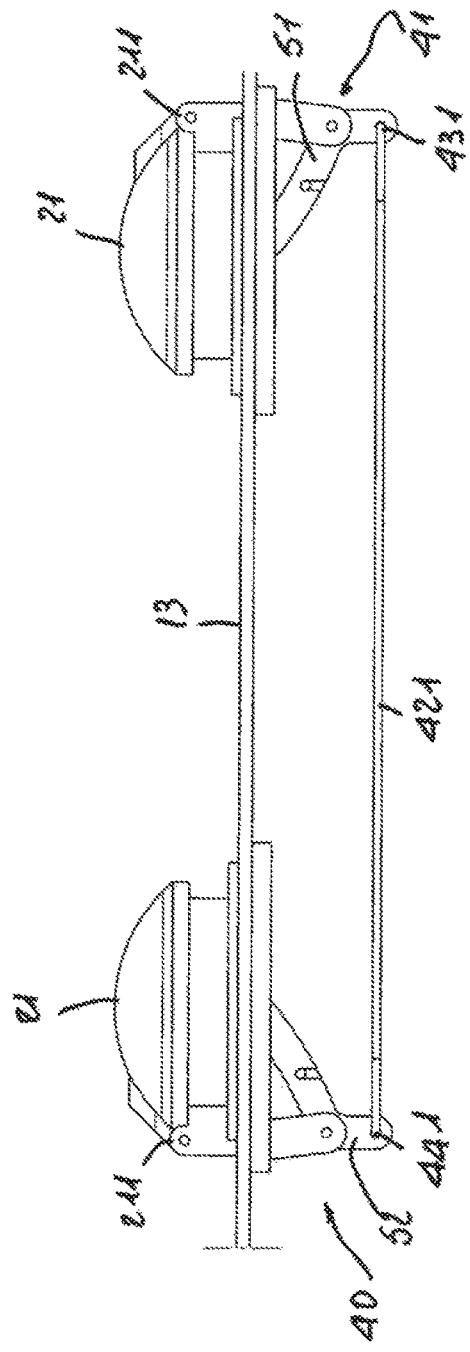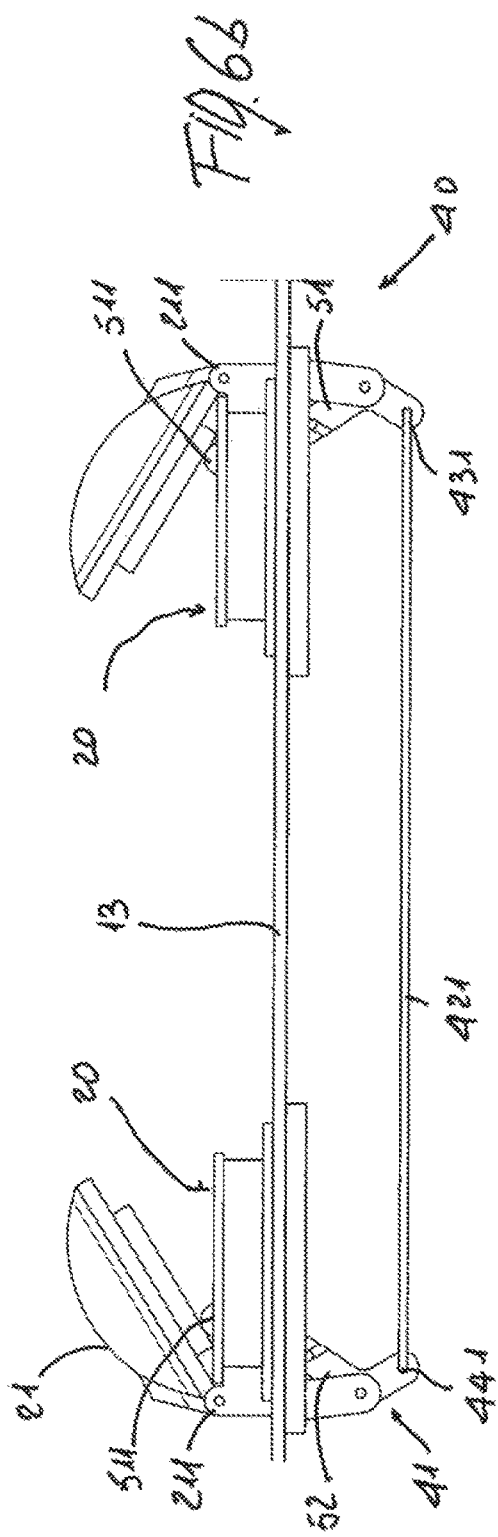

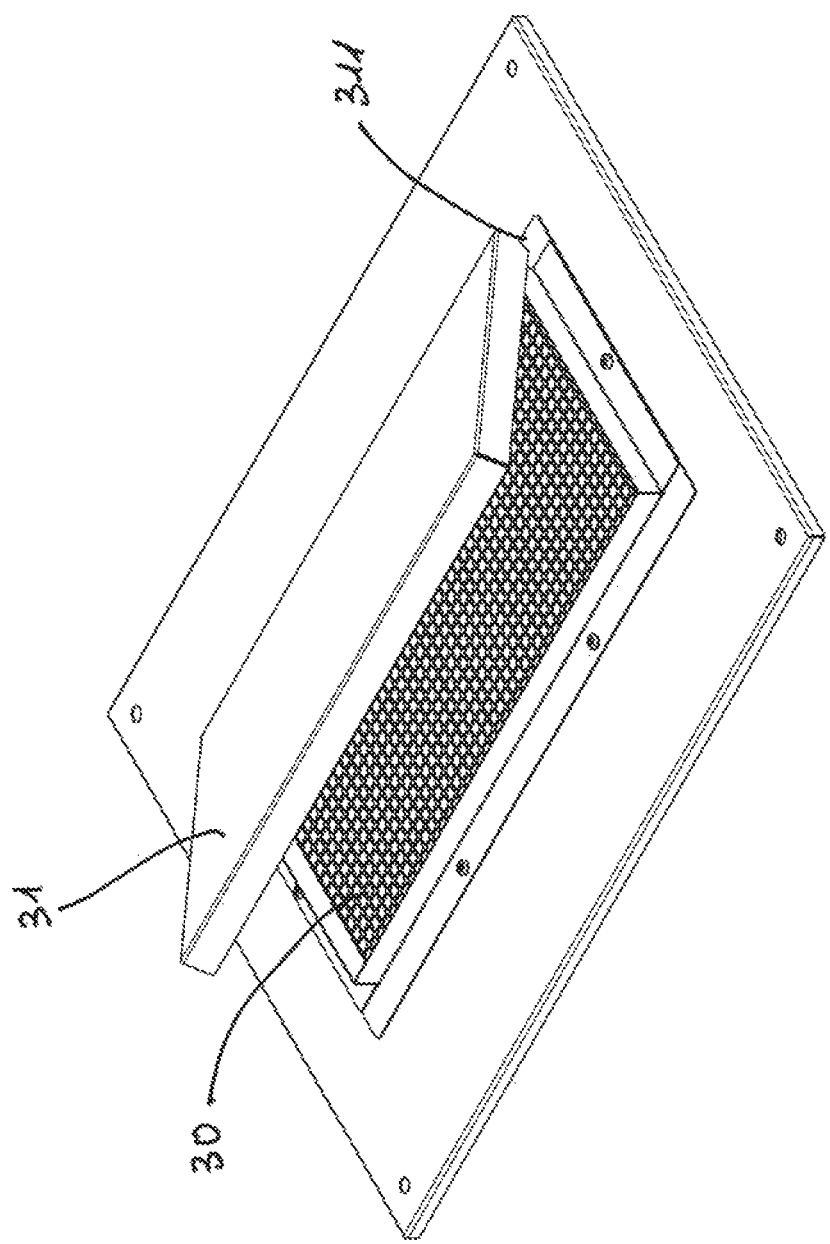

LOW AND MEDIUM VOLTAGE ELECTRICAL ENCLOSURE

BACKGROUND

The present invention relates to a low and medium voltage electrical enclosure, in particular a low and medium voltage electrical enclosure which has improved cooling functions and characteristics.

Generally, an enclosure for low and medium voltage electrical distribution is a well-known equipment formed by a supporting structure delimited by lateral, rear, top and bottom walls and closed by a door, which houses in one or more internal compartments electrical apparatuses and equipment, such as, e.g., circuit breakers and/or similar devices, a bus-bar system, electrical instruments, and similar devices.

At the current state of the art, the existing low and medium voltage electrical enclosures have a number of disadvantages that it would be desirable to overcome.

For instance, one of the problem of known low and medium voltage electrical enclosures is given by the variation of temperature conditions due to the working conditions and/or the number and kind of apparatuses inside the enclosure that brings about a decay of the performances of the apparatus, possibly to an interruption of the service conditions, and even to a breakdown—temporary or permanent—of the apparatuses/equipment inside the enclosure.

Cooling systems can be foreseen in order to avoid or at least mitigate the problems deriving from temperature variations inside the enclosure. However, the known cooling systems, e.g. forced air ventilation inside the enclosure, have in turn a number of disadvantages and may create additional problems.

For instance, a required cabling system may be necessary to provide power and control functionalities to the cooling system, which is moreover subject to periodical maintenance intervention. Also, a dedicated certification may be required, and—in general—the presence of further electrical equipment in the enclosure may create problems of electromagnetic compatibility with the need of performing dedicated EMC tests.

SUMMARY

Hence, the present disclosure is aimed at providing a low and medium voltage electrical enclosure, which allows overcoming at least some of the above-mentioned shortcomings.

In particular, the present invention is aimed at providing a low and medium voltage electrical enclosure in which temperature variations inside it can be easily controlled.

More in particular, the present invention is aimed at providing a low and medium voltage electrical enclosure equipped with a device for controlling the temperature variations inside it, that does not require dedicated cabling and power feed.

Furthermore, the present invention is aimed at providing a low and medium voltage electrical enclosure equipped with a device for controlling the temperature variations inside it that does not require burdensome maintenance intervention.

In addition, the present invention is aimed at providing a low and medium voltage electrical enclosure equipped with a device for controlling the temperature variations inside it that does not require additional tests and certifications.

Also, the present invention is aimed at providing a low and medium voltage electrical enclosure equipped with a device for controlling the temperature variations inside it, that is reliable and relatively easy to produce at competitive costs.

Thus, the present invention relates to a low and medium voltage electrical enclosure comprising a supporting structure which defines an internal space delimited by walls forming one or more compartments housing one or more electrical apparatuses. The low and medium voltage electrical enclosure according to the invention is characterized in that at least one of said walls is provided with one or more venting openings that put into communication said internal space with the outside of said low voltage electrical enclosure and/or one of said compartments with a second compartment, said one or more venting openings being provided with a cover closing a corresponding venting opening in a first—closed—operating condition at first predetermined temperatures and with an actuating device adapted to open said cover in a second—open—operating condition at second predetermined temperatures; the low and medium voltage electrical enclosure according to the invention is further characterized in that said actuating device comprises an actuating mechanism having a Shape Memory Alloy-based (SMA-based) actuating element having a first dimension at said first predetermined temperatures reversibly changeable into a second dimension at said second predetermined temperatures, the reversible change of dimension of said SMA-based actuating element from said first dimension to said second dimension determining the reversible movement of said cover from said first—closed—operating condition to said second—open—operating condition, and vice-versa As better explained in the following description, thanks to the particular structure of the low and medium voltage electrical enclosure according to the invention of the present invention, the above-mentioned problems can be avoided, or at least greatly reduced.

Indeed, under very specific and predetermined temperature conditions the covers closing the one or more openings in the external and/or internal walls of the enclosure may be open, thereby creating a convective air circulation inside the enclosure and keeping the temperatures at desired values. In other words, under specific temperature conditions the IP classification of the enclosure may temporarily vary, depending on to the open/closed status of said one or more openings.

As better explained in the following description, the movement of the covers from the closed to the open conditions is determined and controlled by temperature sensitive actuators, i.e. by actuators that operate according to temperature variations without requiring any additional power feed or a dedicated control system.

In this connection, the actuators used in the enclosures according to the present disclosure is formed by a Shape Memory Alloy-based (SMA-based) actuating element.

Shape Memory Alloys are well known materials—that will not be described in further details—having the capability of changing their dimensions reversibly depending on the temperature conditions. Their response time to the temperature variations is very fast and during their change of dimensions they are able to exert a force which is enough to actuate relatively simple mechanism. Moreover, their temperature coefficient (i.e. the temperature value or range at which they undergo a certain dimensional variation) can be tailored and fine-tuned according to the needs by selecting the appropriate materials according to known criteria.

In other words, the SMA-based actuating elements used in the enclosure according to the present invention change their dimension depending on the temperature conditions inside the enclosure. In particular, at first predetermined temperature conditions the SMA-based actuating element has a first dimension while at second predetermined temperature conditions the SMA-based actuating element has a second dimension. By connecting operatively the SMA-based actuating element to the cover(s) it is therefore possible to move said cover(s) from the closed position to the open position depending on the temperature conditions inside the enclosure.

Thus, for instance, when the temperatures inside the enclosure increase too much—or in any case above a predetermined level—the covers are moved from the closed position to the open position thereby allowing a temporary, controlled, convective air circulation inside the enclosure (as well as temporary changing the IP classification of the enclosure). Then, when the temperatures goes back below said predetermined level the covers are moved back from the open position to the closed position (and consequently also restoring the original IP classification).

Clearly, depending on the needs, the functioning can also be reversed, i.e. when the temperature lowers below a predetermined value or range and such decrease brings about a decay of the working conditions.

The SMA-based actuating element can be based on a Shape Memory Alloy having a negative temperature coefficient, i.e. a Shape Memory Alloy shrinking when the temperature exceeds a predetermined value or range. In this case, the SMA-based actuating element will decrease its operating dimensions (i.e. it will shorten) when the temperature exceeds said predetermined value or range.

Alternatively, the SMA-based actuating element can be based on a Shape Memory Alloy having a positive temperature coefficient, i.e. a Shape Memory Alloy expanding when the temperature exceeds a predetermined value or range. In this case, the SMA-based actuating element will increase its operating dimensions (i.e. it will lengthen) when the temperature exceeds said predetermined value or range.

In addition, due to the very simple operating principles of the SMA-based actuating element (e.g. a linear displacement depending on the temperature), it is worth noting that the actuating mechanism coupling the SMA-based actuating element with the cover(s) can be very simple, and therefore very easy to manufacture and maintain.

In a preferred embodiment of the low and medium voltage electrical enclosure, according to the present invention, the one or more covers are hinged on a rim portion of a corresponding opening. The covers are then pivotally movable between said first—closed—operating condition to said second—open—operating condition, and vice-versa, thanks to the action of the SMA-based actuating element.

In a largely preferred embodiment of the low and medium voltage electrical enclosure of the present invention, the SMA-based actuating element advantageously comprises a bar or wire having a first predetermined length at said first predetermined temperatures and a second predetermined length at second first predetermined temperatures. In practice, according to this embodiment, the SMA-based actuating element will shorten or lengthen depending on the temperature condition, with a linear actuating direction along its longitudinal extension, thereby making very easy its coupling with the actuating mechanism of the cover.

For instance, in such a case, said actuating mechanism may conveniently comprise a lever having a first end which is operatively connected to said cover and a second end which is operatively connected to a first end of said bar or wire. The linear displacement of the SMA-based actuating element is therefore immediately transferred to the cover in a very simple manner.

Then, in a particular embodiment of the he low and medium voltage electrical enclosure of the invention, said bar or wire has a second end which is preferably secured on a fixed point of said enclosure. In practice, according to this embodiment, the movement of the SMA-based actuating element takes place in one direction only, as better explained hereinafter.

Alternatively, in a particular embodiment of the low and medium voltage electrical enclosure of the invention, the enclosure comprises one or more couples of first and second openings which are provided with a corresponding first and second cover. In this embodiment, the SMA-based actuating element advantageously comprises a bar or wire having a first predetermined length at said first predetermined temperatures and a second predetermined length at second first predetermined temperatures. Moreover, the actuating mechanism comprises a first and a second lever each having a first end respectively connected to said first and second cover. Then, said bar or wire has advantageously a first end which is operatively connected to said first lever and a second end which is operatively connected to said second lever.

In practice, according to this embodiment, the SMA-based actuating element is positioned between two openings and corresponding covers and its movement takes place in two directions, simultaneously acting on said first and second lever, as better explained hereinafter.

In a particular embodiment of the low and medium voltage electrical enclosure, according to the present invention, the actuating mechanism may preferably comprise an elastic element cooperating with said SMA-based actuating element during its change of dimension from said first dimension to said second dimension. In this way, the elastic element may help and regulate the opening/closing operation of the covers according to a precise temperature condition.

In particular, in such a case, said elastic element may advantageously be a spring which cooperates with said SMA-based actuating element during the actuation of a corresponding cover from said second—open—operating condition to said first—closed—operating condition, and vice-versa.

In a preferred embodiment of the low and medium voltage electrical enclosure of the present invention, the SMA-based actuating element has a negative temperature coefficient, i.e. said first predetermined temperatures are lower than said second predetermined temperatures and said first dimension of said SMA-based actuating element is greater than said second dimension of said SMA-based actuating element.

Number and positioning of the venting openings on the walls of the low and medium voltage electrical enclosure can vary according to the needs.

For instance, said one or more venting openings can advantageously be positioned on a lateral wall of said enclosure, grouped together or in scattered areas in correspondence of particular positions of said lateral walls, depending on the cooling needs of the various compartments inside the enclosure.

Alternatively to, or in combination with, the previously described embodiment, said one or more venting openings are positioned on a top wall of said enclosure.

Moreover, in a further particular embodiment of the low and medium voltage electrical enclosure of the invention, that can be alternative to or combined with the previous embodiments, said one or more venting openings can be conveniently positioned on an internal wall which separates a first compartment from a second compartment inside the internal space of said enclosure.

BRIEF DESCRIPTION OF THE FIGURES

Further features and advantages of the present invention will be more clear from the description of preferred but not exclusive embodiments of a low and medium voltage electrical enclosure according to the invention, shown by way of examples in the accompanying drawings, wherein:

FIG. 6a is a first side view of a third embodiment of a cover and corresponding actuating device, according to the invention, in a first—closed—operating condition;

FIG. 6b is a second side view of a third embodiment of a cover and corresponding actuating device, according to the invention, in a second—open—operating condition;

FIG. 9 is a perspective view of a second embodiment of a cover and corresponding actuating device, according to the invention, in a second—open—operating condition.

DETAILED DESCRIPTION

Figure 1:
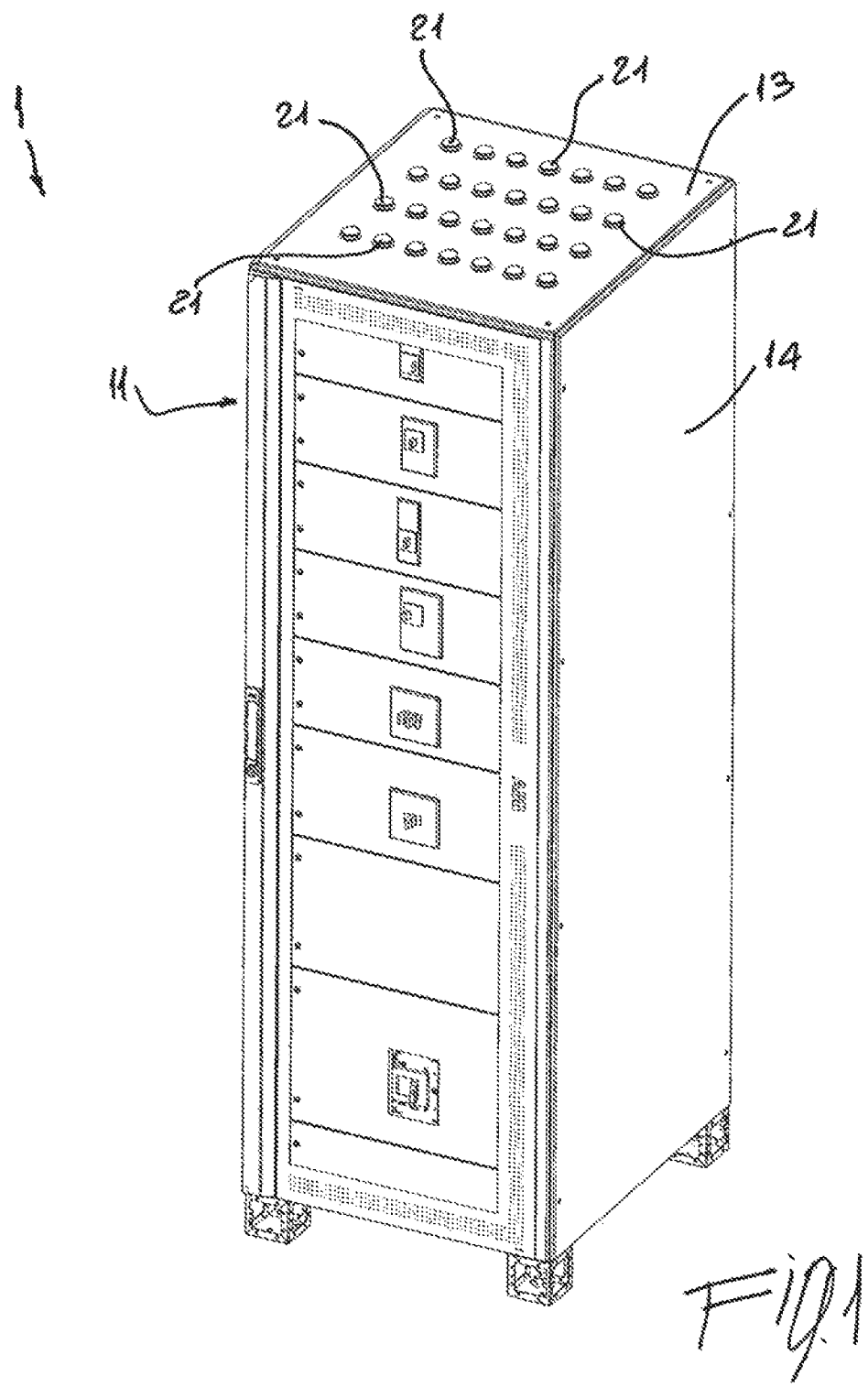
FIG. 1 is a perspective view of a first embodiment of a low and medium voltage electrical enclosure according to the invention.
Figure 2A:
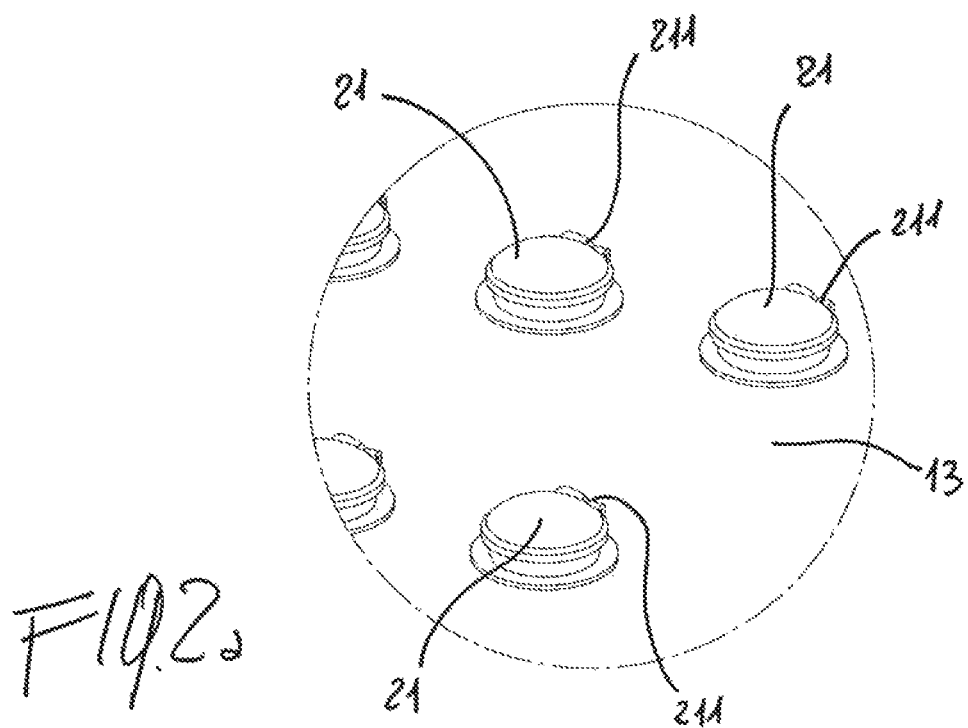
FIG. 2a is a first perspective view of a first embodiment of a cover and corresponding actuating device, according to the invention, in a first—closed—operating condition, as seen from the outside of the enclosure.
Figure 2B:
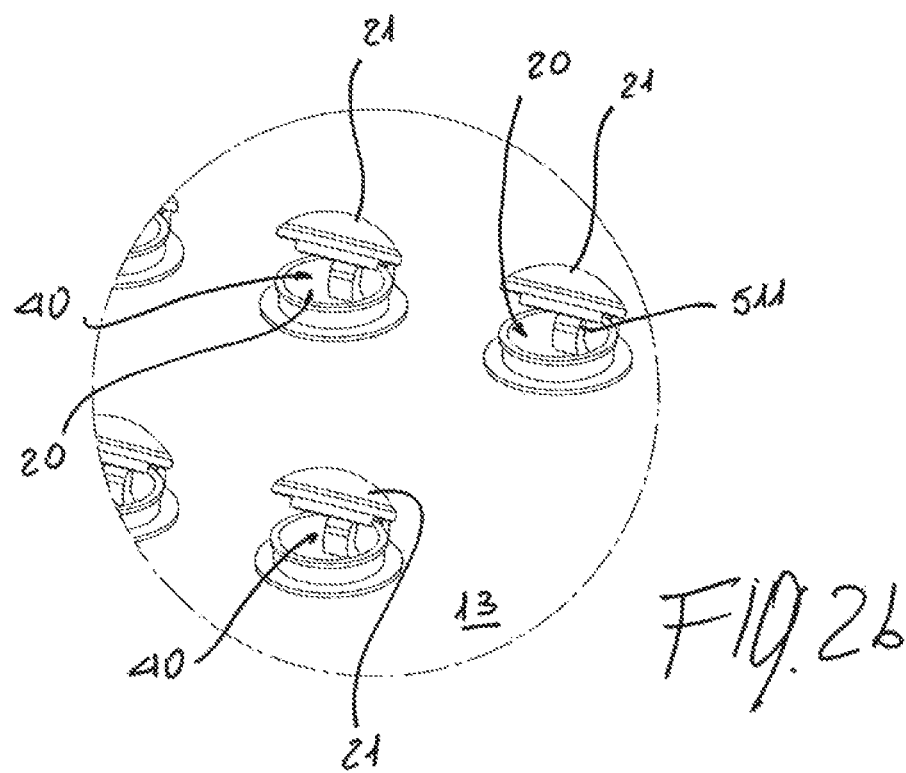
FIG. 2b is a second perspective view of a first embodiment of a cover and corresponding actuating device, according to the invention, in a second—open—operating condition, as seen from the outside of the enclosure.
Figure 3:
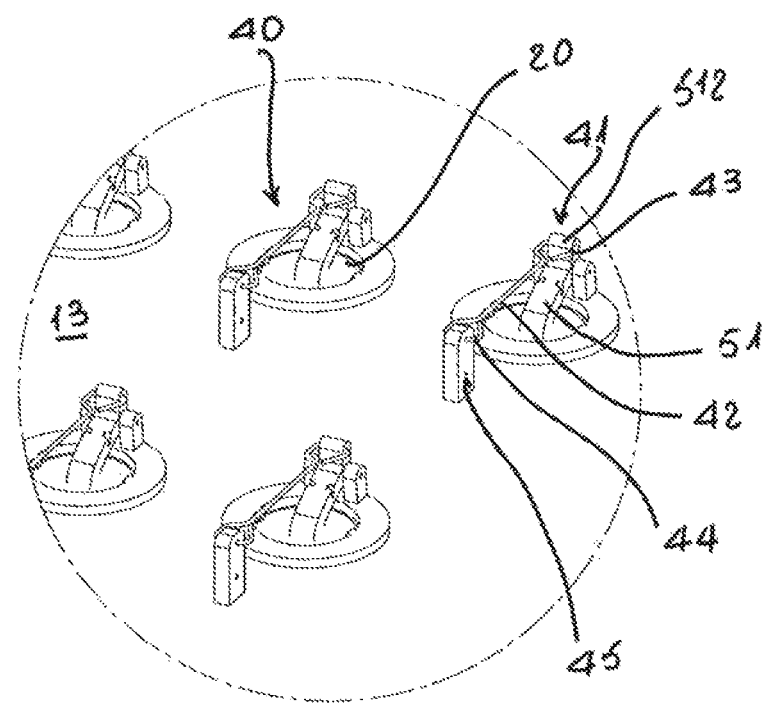
FIG. 3 is a third perspective view of a first embodiment of a cover and corresponding actuating device, according to the invention, in a second—open—operating condition, as seen from the inside of the enclosure.
Figure 4A:
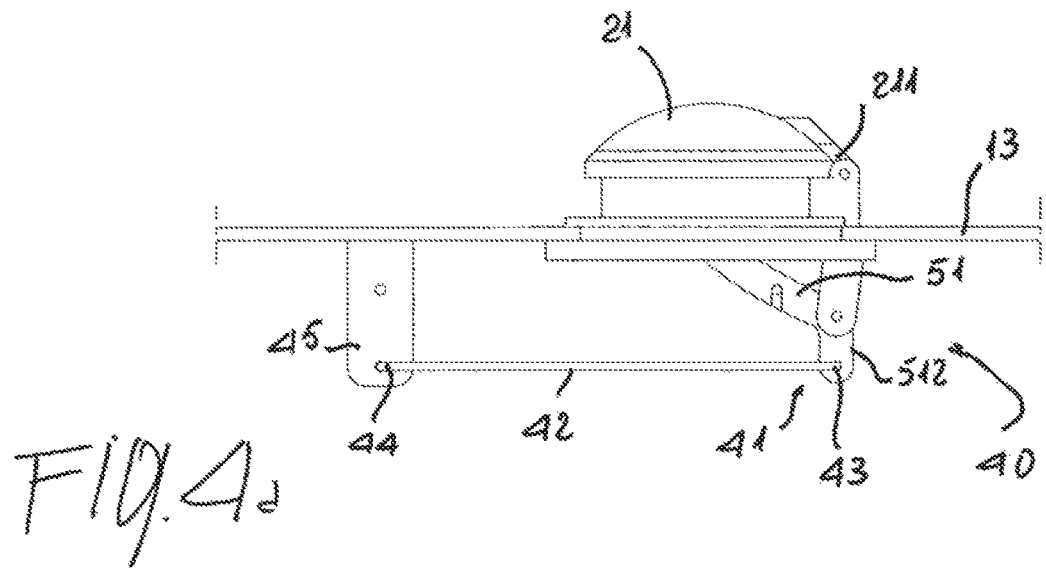
FIG. 4a is a first side view of a first embodiment of a cover and corresponding actuating device, according to the invention, in a first—closed—operating condition.
Figure 4B:
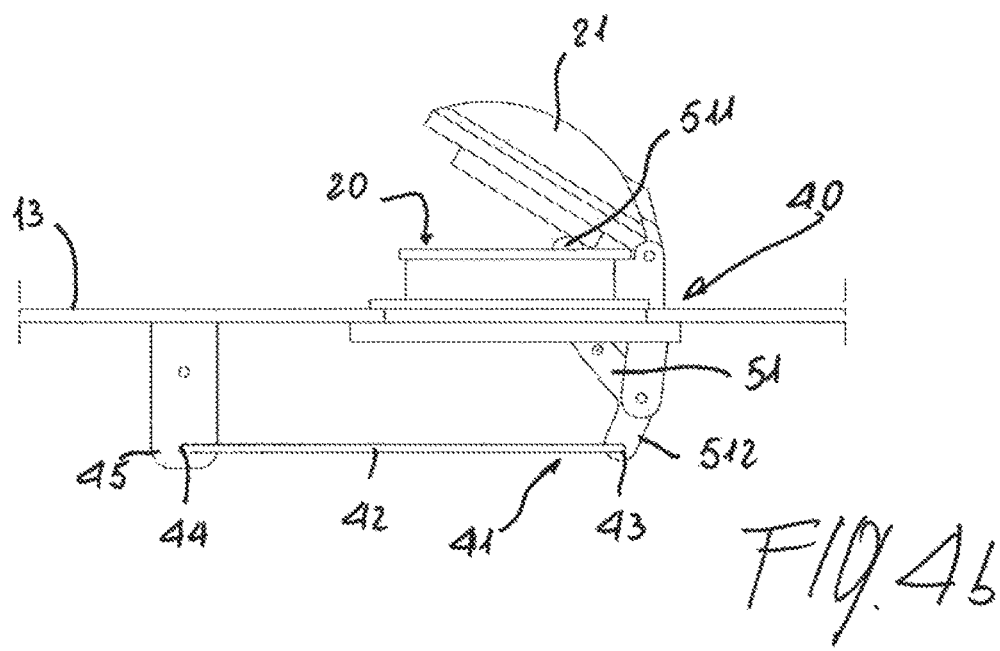
FIG. 4b is a second side view of a first embodiment of a cover and corresponding actuating device, according to the invention, in a second—open—operating condition.

With reference to the attached figures, a low and medium voltage electrical enclosure, designated in the various embodiments with the reference numerals 1, 10, 100, in its more general definition comprises a supporting structure 11 which defines an internal space 12 delimited by a top wall 13, lateral walls 14, and one or more internal walls 15, which form one or more compartments housing one or more electrical apparatuses.

One of distinguishing features of a low and medium voltage electrical enclosure 1, 10, 100 of the present invention is given by the fact that at least one of said external walls 13, 14 is provided with one or more venting openings 20, 30 that put into communication said internal space 12 with the outside of the low and medium voltage electrical enclosure 1, 10, 100. Alternatively or in addition, at least one of the internal walls 15 of the enclosure 1, 10, 100 is also provided with one or more venting openings 20, 30 that put into communication one of said compartments with a second compartment within said internal space 12.

The venting openings 20, 30 are conveniently provided with a corresponding cover 21, 31 closing said venting opening 20, 30 in a first—closed—operating condition at first predetermined temperatures. The electrical enclosure 1, 10, 100 is also conveniently provided with an actuating device 40 which is adapted to move said cover 21, 31 from said first—closed—operating condition to a second—open—operating condition at second predetermined temperatures.

A further distinguishing features of the low and medium voltage electrical enclosure 1, 10, 100 of the present invention is given by the fact that said actuating device 40 conveniently comprises an actuating mechanism 41 having a Shape Memory Alloy-based (SMA-based) actuating element 42, 421 having a first dimension at said first predetermined temperatures reversibly changeable into a second dimension at said second predetermined temperatures.

Thus, when said SMA-based actuating element 42, 421 reversibly changes its dimension from said first dimension to said second dimension, a reversible movement of said cover 21, 31 from said first—closed—operating condition to said second—open—operating condition, and vice-versa, is thereby determined.

Under the open condition, a controlled convective ventilation of the low and medium voltage electrical enclosure 1, 10, 100 is therefore possible, until when the temperature is restored below said first predetermined temperatures. At this point, the SMA-based actuating element 42, 421 changes its dimension from said second dimension to said first dimension, thereby moving said cover 21, 31 from said second—open—operating condition to said first—closed—operating condition and restoring the original closed conditions of the enclosure 1, 10, 100 and the original IP rating.

As shown in the attached figures, in a preferred embodiment of the presently disclosed low and medium voltage electrical enclosure 1, 10, 100, the cover 21, 31 can be hinged on a rim portion 211, 311 of a corresponding opening 20, 30. The cover 21, 31 is then pivotally movable between said first—closed—operating condition and said second—open—operating condition, according to the previously described mechanism.

In a largely preferred embodiment of the low and medium voltage electrical enclosure 1, 10, 100 of the present invention, the SMA-based actuating element 42, 421 preferably comprises a bar or wire which has a first predetermined length at said first predetermined temperatures and a second predetermined length at second first predetermined temperatures.

As shown in the attached figures, when the SMA-based actuating element 42, 421 is formed by bar or wire, the actuating mechanism can be very simple. In particular, with reference to FIGS. 2-6, in such a case said actuating mechanism 41 advantageously comprises a lever 51 which have a first end 511 operatively connected to a corresponding cover 21, 31 and a second end 512 which is operatively connected to a first end 43, 431 of said bar or wire 42, 421.

In embodiments of the low and medium voltage electrical enclosure 1, 10, 100 shown in FIGS. 2-5 said bar or wire 42 has a second end 44 which is secured on a fixed point 45 of said enclosure 1, 10, 100. The movement of the SMA-based actuating element 42 therefore takes place in one direction only, with the first end 43 of the bar or wire 42 acting on the second end 512 of the lever, thereby determining its displacement and the consequent movement of the cover 21 from the closed to the open position, and vice-versa.

In an alternative embodiment of the low and medium voltage electrical enclosure 1, 10, 100 shown in FIGS. 6, the electrical enclosure 1, 10, 100 comprises one or more couples of first and second venting openings 20 which are provided with a corresponding first and second cover 21.

In this case, the SMA-based actuating element 421 advantageously comprises a bar or wire having a first predetermined length at said first predetermined temperatures and a second predetermined length at said second predetermined temperatures. In turn, the actuating mechanism 41 advantageously comprises a first 51 and a second lever 52 each having a first end 511 respectively connected to said first and second cover 21. Moreover, said bar or wire 421 has a first end 431 which is operatively connected to said first lever 51 and a second end 441 which is operatively connected to said second lever 52.

In practice, according to this embodiment, the SMA-based actuating element 421 is positioned between two venting openings 20 and corresponding covers 21 mirroring each other. The movement of the bar or wire 421 takes place in two opposite directions, simultaneously acting on said first 51 and second 52 lever, with the first end 431 of the bar or wire 421 acting on the first lever 51 and the second end 441 of the bar or wire 421 acting on the second lever 52, thereby determining their displacement in opposite directions and the consequent movement of the covers 21 from the closed to the open position, and vice-versa.

Figure 5A:
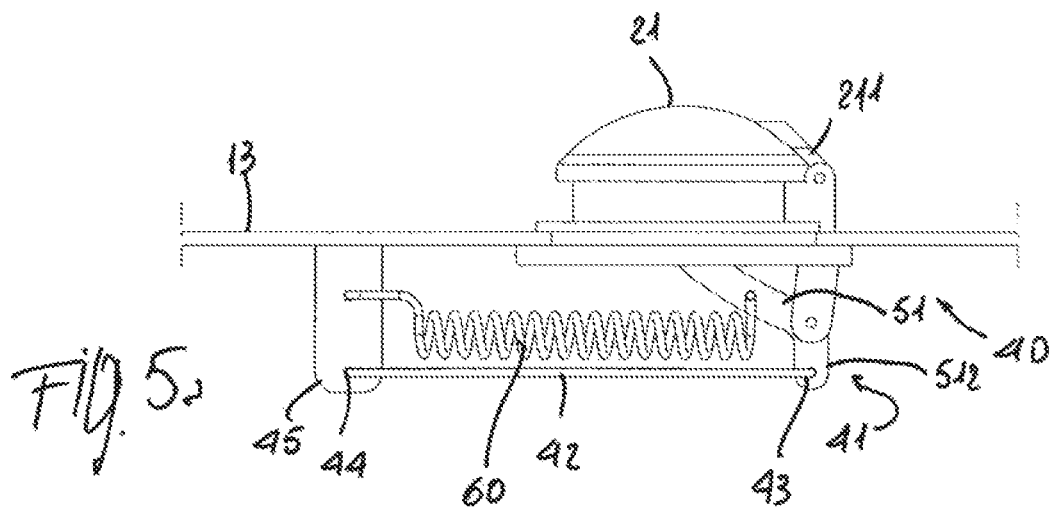
FIG. 5a is a first side view of a second embodiment of a cover and corresponding actuating device, according to the invention, in a first—closed—operating condition.
Figure 5B:
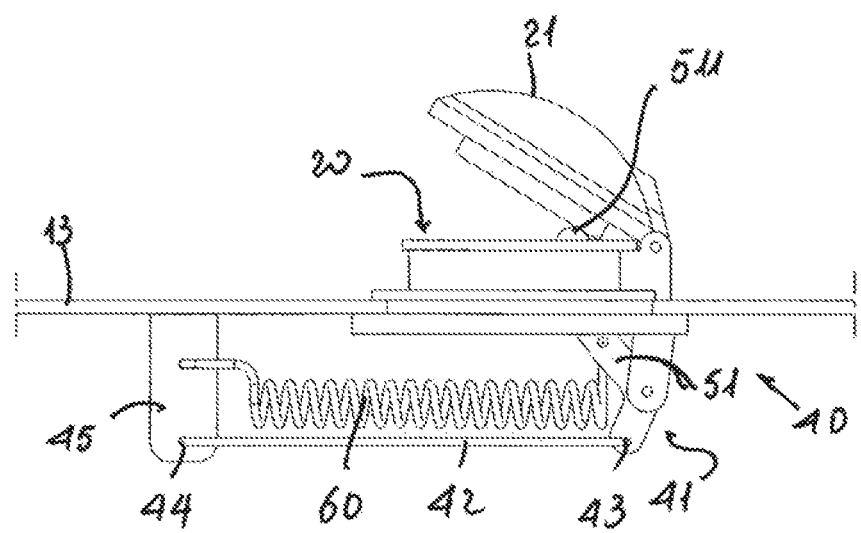
FIG. 5b is a second side view of a second embodiment of a cover and corresponding actuating device, according to the invention, in a second—open—operating condition.

With reference to FIGS. 5, in a particular embodiment the low and medium voltage electrical enclosure 1, 10, 100 of the present disclosure, the actuating mechanism 41 advantageously comprises an elastic element 60 which cooperates with said SMA-based actuating element 42, 421 during its change of dimension from said first dimension to said second dimension.

Said elastic element 60 can be formed for instance by a spring having an end secured on a fixed point of the enclosure 1, 10, 100 and a second end secured on a suitable point of the lever 51. The spring 60 therefore cooperates with the SMA-based actuating element 42, 421 during the movement of said cover 21, 31 from said second—open— operating condition to said first—closed—operating condition. In practice, according to this embodiment the spring 60 is mechanically positioned in parallel to the SMA-based actuating element 42, 421 and may help and regulate the opening/closing operation of the covers according to a precise temperature condition.

In the embodiment of the low and medium voltage electrical enclosure 1, 10, 100 shown in the attached figures, said first predetermined temperatures are lower than said second predetermined temperatures and the first dimension of said SMA-based actuating element 42, 421 is greater than said second dimension of said SMA-based actuating element 42, 421.

In other words, in the embodiments shown, the SMA-based actuating element 42, 421 is based on a Shape Memory Alloy having a negative temperature coefficient, i.e. a Shape Memory Alloy shrinking when the temperature exceeds a predetermined value or range. Thus, the SMA-based actuating element 42, 412 shortens when the temperature exceeds said predetermined value or range.

Alternatively, according to embodiment not shown, but which are based on a reversal of the operating conditions, the SMA-based actuating element 42, 421 can be based on a Shape Memory Alloy having a positive temperature coefficient, i.e. a Shape Memory Alloy expanding when the temperature exceeds a predetermined value or range. In this case, the SMA-based actuating element 42, 421 will increase its operating dimensions (i.e. it will lengthen) when the temperature exceeds said predetermined value or range.

Figure 7:
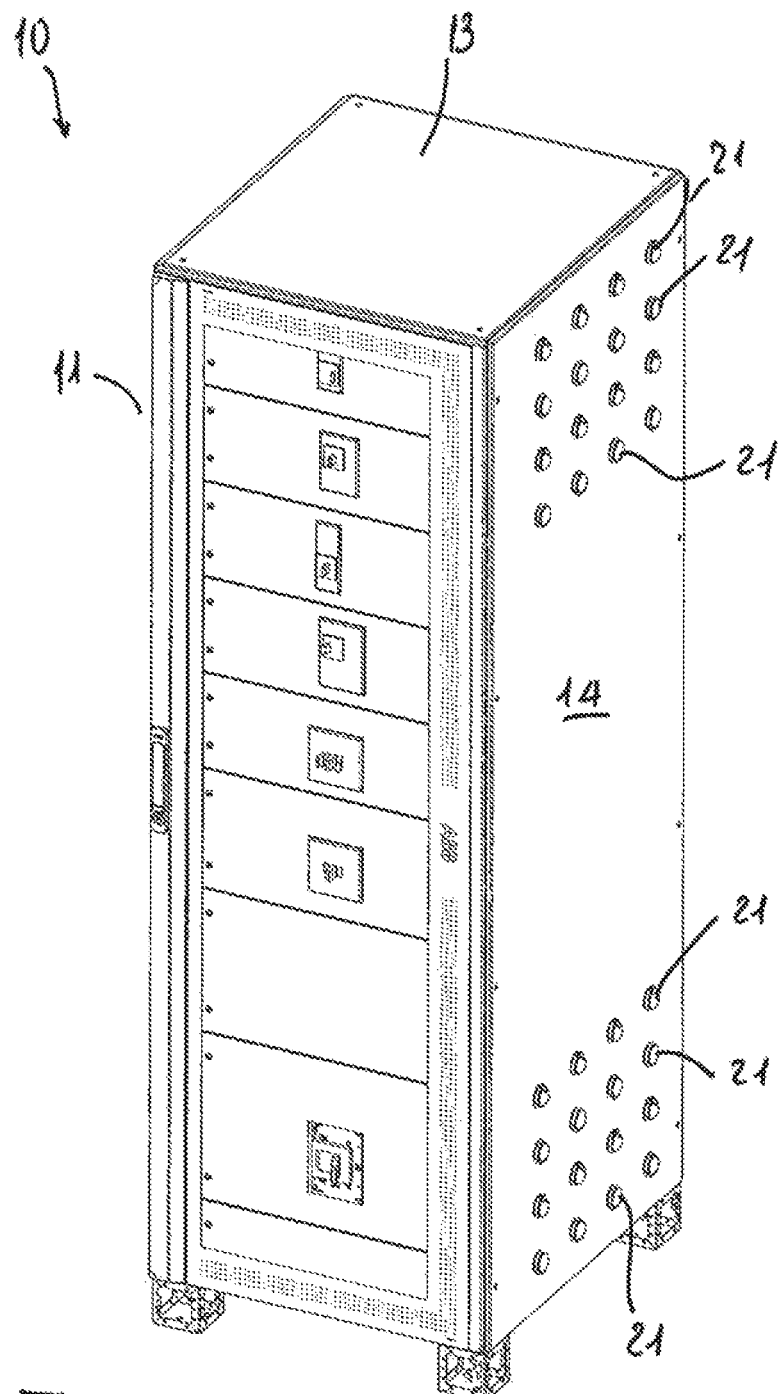
FIG. 7 is a perspective view of a second embodiment of a low and medium voltage electrical enclosure according to the invention.

With reference to FIG. 7, in an embodiment of the low and medium voltage electrical enclosure 10 of the invention, the venting openings 20 are positioned on a lateral wall 14 of said enclosure 10, in particular they are concentrated in a first location at the bottom of the wall 14 and in a second location at the top of the wall 14. However, as previously said, the positioning of the venting openings 20 may vary, depending on the cooling needs of the various compartments inside the enclosure 10.

Alternatively, with reference to FIG. 1, said one or more venting openings 20, 30 can be conveniently positioned on a top wall 13 of the enclosure 1.

Figure 8:
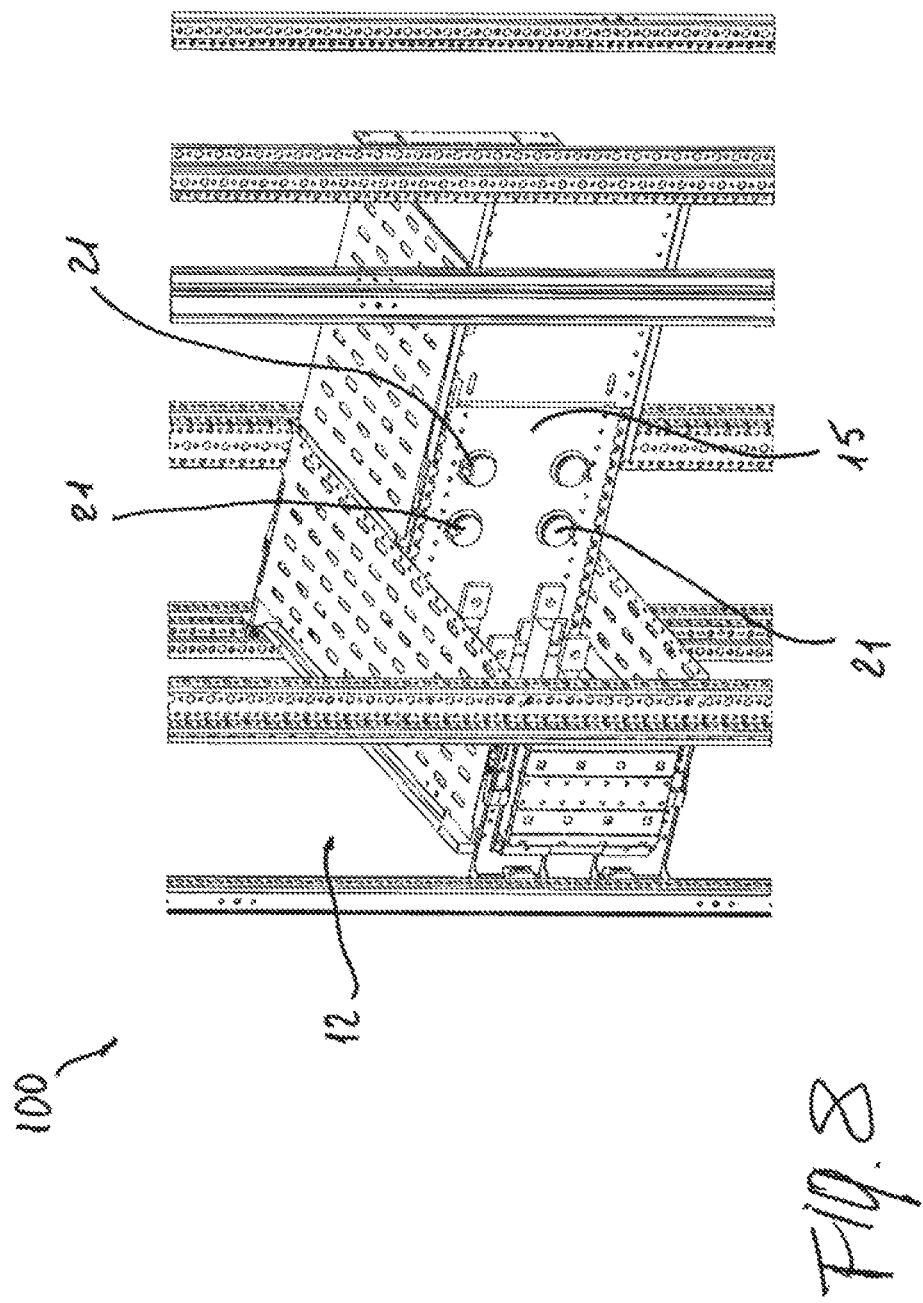
FIG. 8 is a perspective view of a third embodiment of a low and medium voltage electrical enclosure according to the invention.

In a particular embodiment of the low and medium voltage electrical enclosure 100 of the present invention, said one or more venting openings 20, 30 can be conveniently positioned on an internal wall 15 of the enclosure 100 which separate a first compartment form a second compartment in the internal space 12 of said enclosure 100. The embodiment is shown in FIG. 8, where a detail of the internal space 12 of the enclosure 100 is represented without the lateral walls for sake of clarity.

It is clear that, for what concerns number and positioning of the venting openings 20, 30 in the low and medium voltage electrical enclosure 100 of the present invention, any combination of the previously described embodiment is also possible.

The shape and dimension of the venting openings can be selected according to the needs. For instance, with reference to FIGS. 1-8, the shape of the venting openings 20 and of the corresponding covers 21 can be circular. However, as shown with reference to FIG. 9, the shape of the venting opening 30 and of the corresponding cover 31 can also be squared or rectangular. When the dimensions of the openings 20, 30 are relatively wide, and/or when it may be advisable to have some kind of protection thereon, a net or mesh 30 can be conveniently positioned in correspondence of said openings.

It is clear from the above description that the low and medium voltage electrical enclosure of the present invention, fully achieve the intended aims and solved the above-highlighted problems of the existing enclosures.

In particular, in the low and medium voltage electrical enclosure of the present invention, the temperature variations inside can be easily controlled by predetermining the closing/opening temperatures of the covers of the venting openings and consequently selecting the appropriate material for the SMA-based actuating element.

In this way, the device for controlling the temperature variations inside the low and medium voltage electrical enclosure does not require dedicated cabling and power feed and is very easy and quick to install.

As a consequence also of the very simple structure of the device for controlling the temperature variations inside the enclosure, the maintenance intervention are normally unnecessary or they are very simple and quick to perform.

Moreover, since there are no electrical or additional components, there are no problems of compatibility and consequently there is no need of performing dedicated EMC tests or obtaining additional certifications.

Several variations can be made to the low and medium voltage electrical enclosure thus conceived all falling within the scope of the attached claims. In practice, the materials used and the contingent dimensions and shapes can be any, according to requirements and to the state of the art.

The invention claimed is:

1. An electrical enclosure comprising:
a supporting structure which defines an internal space delimited by walls forming one or more compartments housing one or more electrical apparatuses,
wherein at least one of said walls is provided with one or more venting openings that put into communication at least one of said internal space with the outside of said electrical enclosure or one of said compartments with a second compartment,
wherein said one or more venting openings are provided with a cover closing a corresponding venting opening in a first—closed—operating condition at first predetermined temperatures and with an actuating device adapted to open said cover in a second—open—operating condition at second predetermined temperatures, and
wherein said actuating device comprises an actuating mechanism having a Shape Memory Alloy-based (SMA-based) actuating element having a first dimension at said first predetermined temperatures reversibly changeable into a second dimension at said second predetermined temperatures, the reversible change of dimension of said SMA-based actuating element from said first dimension to said second dimension determining the reversible movement of said cover from said first—closed—operating condition to said second—open—operating condition, and vice-versa,
wherein said actuating mechanism comprises a lever having a first end operatively connected to said cover, said lever extending at least partially within the venting opening and into the internal space to a second end, the second end being operatively connected to a first end of said SMA-based actuating element, said lever being hinged on a fixed point of said enclosure at a mid-point between said first end and said second end.

2. The electrical enclosure, according to claim 1, wherein said cover is hinged on a rim of a corresponding opening and pivotally movable between said first—closed—operating condition to said second—open—operating condition.

3. The electrical enclosure, according to claim 2, wherein said SMA-based actuating element comprises a bar or wire having a first predetermined length at said first predetermined temperatures and a second predetermined length at said second predetermined temperatures.

4. The electrical enclosure, according to claim 3, wherein said bar or wire is secured on a fixed point of said enclosure.

5. The electrical enclosure, according to claim 4, wherein said actuating mechanism comprises an elastic element cooperating with said SMA-based actuating element during its change of dimension from said first dimension to said second dimension.

6. The electrical enclosure, according to claim 5, wherein said elastic element is a spring cooperating with said SMA-based actuating element during the movement of said cover from said second—open—operating condition to said first—closed—operating condition.

7. The electrical enclosure, according to claim 3, wherein said first predetermined temperatures are lower than said second predetermined temperatures and in that said first dimension of said SMA-based actuating element is greater than said second dimension of said SMA-based actuating element.

8. The electrical enclosure, according to claim 7, wherein said one or more venting openings are positioned on a lateral wall of said enclosure.

9. The electrical enclosure, according to claim 2, further comprising one or more couples of first and second venting openings provided with a corresponding first and second cover, and in that said SMA-based actuating element comprises a bar or wire having a first predetermined length at said first predetermined temperatures and a second predetermined length at said second predetermined temperatures, said actuating mechanism comprising a first and a second lever each having a first end respectively connected to said first and second cover, said bar or wire having a first end operatively connected to said first lever and a second end connected to said second lever.

10. The electrical enclosure, according to claim 1, wherein said one or more venting openings are positioned on a lateral wall of said enclosure.

11. The electrical enclosure, according to claim 1, wherein said one or more venting openings are positioned on a top wall of said enclosure.

12. The electrical enclosure, according to claim 1, wherein said one or more venting openings are positioned on an internal wall separating a first compartment form a second compartment of said enclosure.

13. The electrical enclosure, according to claim 1, wherein said SMA-based actuating element comprises a bar or wire having a first predetermined length at said first predetermined temperatures and a second predetermined length at said second predetermined temperatures.

14. The electrical enclosure, according to claim 13, wherein said bar or wire is secured on a fixed point of said enclosure.

15. The electrical enclosure, according to claim 1, wherein said actuating mechanism comprises an elastic element cooperating with said SMA-based actuating element during its change of dimension from said first dimension to said second dimension.

16. The electrical enclosure, according to claim 1, wherein said first predetermined temperatures are lower than said second predetermined temperatures and in that said first dimension of said SMA-based actuating element is greater than said second dimension of said SMA-based actuating element.

17. An electrical enclosure comprising a supporting structure which defines an internal space delimited by walls forming one or more compartments housing one or more electrical apparatuses, wherein at least one of said walls is provided with one or more venting openings that put into communication at least one of said internal space with the outside of said electrical enclosure or one of said compartments with a second compartment, said one or more venting openings being provided with a cover closing a corresponding venting opening in a first—closed—operating condition at first predetermined temperatures and with an actuating device adapted to open said cover in a second—open—operating condition at second predetermined temperatures, and wherein said actuating device comprises an actuating mechanism having a Shape Memory Alloy-based (SMA-based) actuating element having a first dimension at said first predetermined temperatures reversibly changeable into a second dimension at said second predetermined temperatures, the reversible change of dimension of said SMA-based actuating element from said first dimension to said second dimension determining the reversible movement of said cover from said first—closed—operating condition to said second—open—operating condition, and vice-versa, the electrical enclosure further comprising one or more couples of first and second venting openings provided with a corresponding first and second cover, and in that said SMA-based actuating element comprises a bar or wire having a first predetermined length at said first predetermined temperatures and a second predetermined length at said second predetermined temperatures, said actuating mechanism comprising a first and a second lever each having a first end respectively connected to said first and second cover, said bar or wire having a first end operatively connected to said first lever and a second end connected to said second lever.

18. The electrical enclosure, according to claim 17, wherein said actuating mechanism comprises an elastic element cooperating with said SMA-based actuating element during its change of dimension from said first dimension to said second dimension.

\* \* \* \* \*